United States Patent
Wasicek et al.

(10) Patent No.: US 12,008,140 B2
(45) Date of Patent: Jun. 11, 2024

(54) PRIVACY PERSONAS USING SYNTHETIC PERSONALLY IDENTIFIABLE INFORMATION

(71) Applicant: Avast Software s.r.o., Prague (CZ)

(72) Inventors: Armin Wasicek, El Cerrito, CA (US); Juyong Do, Cupertino, CA (US); Rajarshi Gupta, Los Altos, CA (US)

(73) Assignee: Avast S oftware s.r.o., Prague (CZ)

( * ) Notice: Subject to any disclaimer, the term of this patent is extended or adjusted under 35 U.S.C. 154(b) by 150 days.

(21) Appl. No.: 16/586,734

(22) Filed: Sep. 27, 2019

(65) Prior Publication Data
US 2021/0097201 A1 Apr. 1, 2021

(51) Int. Cl.
G06Q 30/00 (2023.01)
G06F 21/62 (2013.01)
G06N 20/00 (2019.01)

(52) U.S. Cl.
CPC ...... *G06F 21/6254* (2013.01); *G06F 21/6263* (2013.01); *G06N 20/00* (2019.01)

(58) Field of Classification Search
CPC .. G06F 21/6254; G06F 21/6263; G06F 21/32; G06F 21/6245; G06N 20/00; G06N 3/0454; G06N 3/0472; G06N 3/088
See application file for complete search history.

(56) References Cited

U.S. PATENT DOCUMENTS

| | | | | |
|---|---|---|---|---|
| 8,694,646 B1 * | 4/2014 | Kothari | ................. | G06F 16/258 709/227 |
| 9,703,986 B1 * | 7/2017 | Ashley | ................ | G06F 21/6263 |
| 10,320,753 B1 | 6/2019 | Ashley et al. | | |
| 10,574,698 B1 * | 2/2020 | Sharifi Mehr | ...... | H04L 63/1491 |
| 2004/0181683 A1 | 9/2004 | Jia et al. | | |
| 2012/0110062 A1 * | 5/2012 | Savage | .................... | H04L 67/01 709/203 |
| 2015/0205776 A1 * | 7/2015 | Bhatia | .................... | G06Q 30/02 715/224 |
| 2015/0278157 A1 * | 10/2015 | Srivastava | .............. | H04L 43/04 703/2 |
| 2018/0198769 A1 * | 7/2018 | Norris | .................... | H04W 12/02 |
| 2019/0281086 A1 * | 9/2019 | Sherif | ................. | H04L 63/1466 |

(Continued)

FOREIGN PATENT DOCUMENTS

| | | | | |
|---|---|---|---|---|
| EP | 3394779 B1 * | 11/2021 | ............. | G06F 21/31 |
| EP | 3985540 A1 * | 4/2022 | ......... | G06F 21/6245 |

OTHER PUBLICATIONS

"Removing Personally Identifiable Information from Shared Dataset for Keystroke Authentication Research", Jiaju Huang et al., International Conference on Identity, Security, and Behavior Analysis. IEEE, 2019. (Year: 2019).*

(Continued)

*Primary Examiner* — Michael Bekerman
(74) *Attorney, Agent, or Firm* — AVEK IP, LLC; Mark C. Young; William B. Kircher (57) ABSTRACT

Systems and methods receive a form having one or more fields for receiving personally identifying information (PII). Input data that includes PII is received for the form. The system and methods model the characteristics of true PII to generate a model associated with the form. Synthetic PII is generated based, at least in part, the true PII and the model. The synthetic PII is provided to the one or more fields of the form.

24 Claims, 7 Drawing Sheets

(56) References Cited

U.S. PATENT DOCUMENTS

2019/0340466 A1* 11/2019 Berseth ............... G06K 9/6257
2020/0026877 A1    1/2020 Dattatri et al.
2020/0074466 A1    3/2020 Kurian et al.
2021/0051176 A1*  2/2021 Stolfo ................ H04L 63/1491
2021/0099454 A1*  4/2021 Rahimi ............... H04L 63/102
2022/0116199 A1*  4/2022 Kim ..................... G06N 20/00

OTHER PUBLICATIONS

Bellovin, Steven M., Preetam K. Dutta, and Nathan Reitinger. "Privacy and synthetic datasets." Stan. Tech. L. Rev. 22 (2019): 1. (Year: 2019).*

Norton Privacy Manager: Help manage and control what personal information you share online, https://web.archive.org/web/20190501155002/https://us.norton.com/internetsecurity-privacy-norton-privacy-manager-help-manage-and-control-what-personal-information-you-share-online.html, 5 pages. Accessed Dec. 30, 2019.

Norton Privacy Manager Help Take Control of Your Online Privacy, https://web.archive.org/web/20190709174550/https://us.norton.com/norton-privacy-manager, 5 pages. Accessed Dec. 30, 2019.

Vulnerability- and Diversity-Aware Anonymization of Personally Identifiable Information for Improving User Privacy and Utility of Publishing Data; Abdul Majeed et al.; May 8, 2017 (Year: 2017).

* cited by examiner

PRIVACY PERSONAS USING SYNTHETIC PERSONALLY IDENTIFIABLE INFORMATION

FIELD

The disclosure relates generally to web browsers, and more particularly, to creating synthetic personally identifiable information for submission on digital interfaces for entering personal information including, but not limited to web browser forms.

BACKGROUND

Many web applications and popular on-line services require entry of personal data in order to receive content or services. However, by providing personally identifiable information (PII), consumers relinquish privacy in exchange for the content or service. Further, providing PII exposes users to various risks that the data will be leaked and/or misused.

In order to avoid the loss of privacy that may be associated with providing personally identifiable information on forms such as web browser forms, some users may provide fictitious information by making up fake names, addresses and/or other personally identifiable information. However, service providers have developed ways to detect when fictitious information has been provided on a form and can reject the form. Further, the user may have difficulty remembering the fake user ID and fake PII associated with the fake user ID. Finally, a fake user ID conceived by the user might not provide the privacy protection that the user intends to obtain.

BRIEF DESCRIPTION OF THE DRAWINGS

For a better understanding of the inventive subject matter, reference may be made to the accompanying drawings in which.

DETAILED DESCRIPTION

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

In some embodiments, a system protects user privacy by creating highly realistic, synthetic PII based on the source PII, and maintains synthetic identifiers associated with the synthetic PII across devices and changing detection mechanisms. In some aspects, the source PII can be a user's true PII. In alternative aspects, the source PII can be the PII of a randomly selected persona. In aspects where the source PII comprises that of a randomly selected persona, the synthetic PII can be generated without knowing the true PII of a user. The synthetic PII can be automatically generated and used for input to untrusted forms. In further embodiments, the system can use motion in the PII data market at large to derive when and where these synthetic identifiers were leaked.

Figure 1:
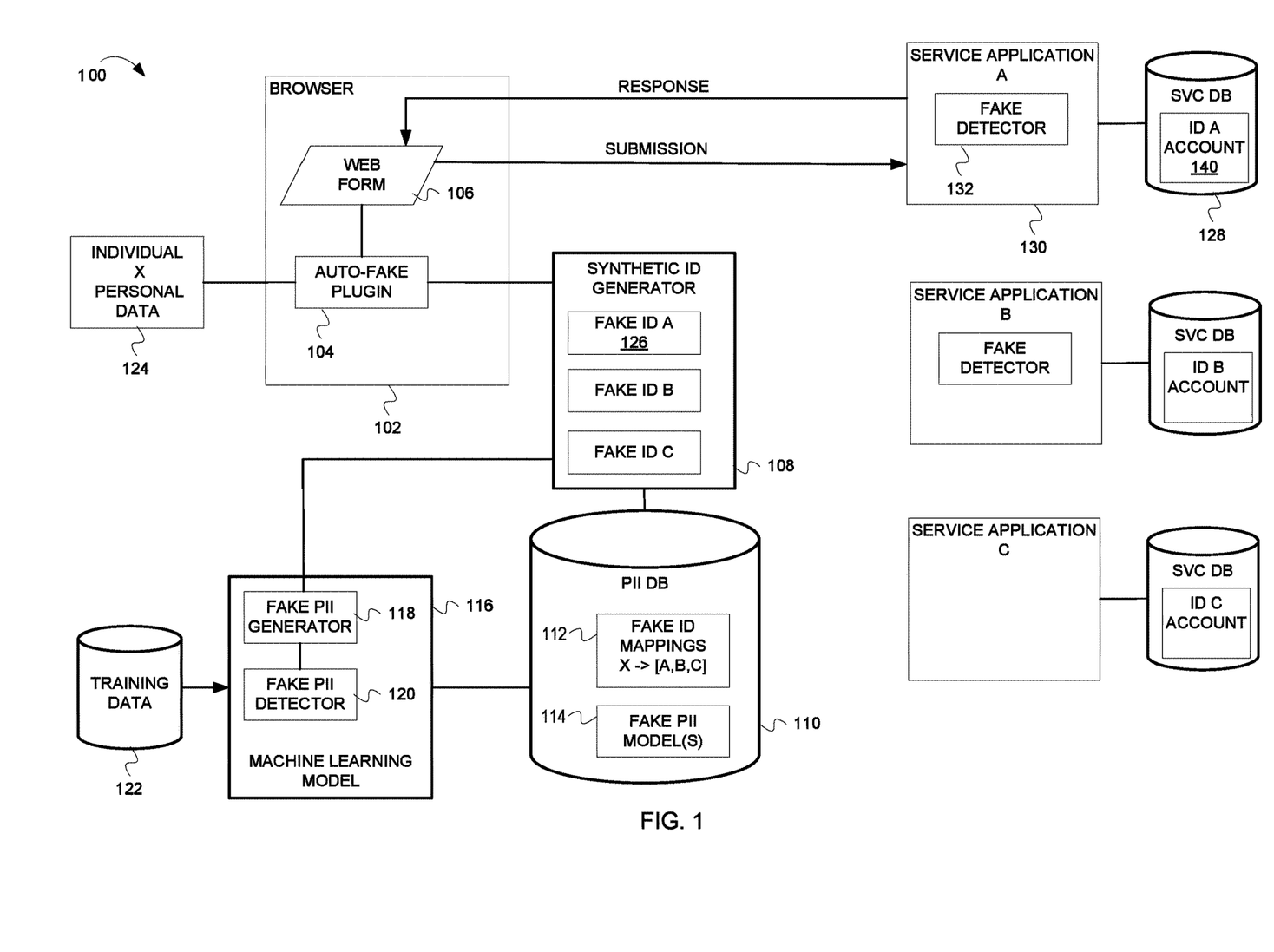
FIG. 1 is a block diagram of an operating environment for a system that generates and maintains synthetic PII.

FIG. 1 is a block diagram of an operating environment for a system 100 that generates and maintains synthetic PII. Examples of PII include names, addresses and other geographic information, birthdates, email addresses, phone numbers, URLs or IP addresses, social security numbers, credit card numbers, profile pictures, vehicle identifiers and license numbers, medical data, health plan data, and biometric identifiers, In some embodiments, system 100 includes a browser 102, a synthetic ID generator 108, and a machine learning model (MLM) 116.

MLM 116 can be trained to produce fake PII models 114. The fake PII models can then be used by synthetic ID generator 108 to generate synthetic PII and fake IDs associated with the generated synthetic PII. The fake IDs and synthetic PII can be provided to an auto-fake plugin 104 of a browser 102 when a user wishes to provide fake PII on web form 106 provided by a service application 130 for display by browser 102. MLM 116 may be one of various types of machine learning models. In some aspects, MLM 116 can be a Deep Neural Network. In some aspects, MLM 116 can be a generative adversarial network. In some aspects, the Word2vec model may be used as part of MLM 116.

In some embodiments, MLM 116 receives training data 122. Training data 122 can be general collections of names, addresses, birthdates, credit card data, profile pictures and other data that is typically entered on web forms requesting PII. The training data 122 may come from a variety of sources. In some embodiments, a general collection of name data may be obtained from a database available at the URL www.kaggle.com/datagov/usa-names. In some embodiments, a general collection of address data may be obtained from a database available at the URL results.openaddresses.io. In some embodiments, a general collection of credit card number data can be generated using a credit card number generator available at the URL www.fakecreditcardgenerator.net. In some embodiments, a general collection of profile pictures can be obtained from the URL facedataset.com and/or the URL susanqq.github.io/UTKFace/. In some aspects, a general collection of vehicle data may be obtained from the URL www.teoalida.com/cardatabase/. The databases named above are merely examples of locations that various types of PII data may be obtained. Other sources of training data are possible and within the scope of the disclosure.

MLM 116 can include a fake PII generator 118 and a fake PII detector 120. The fake PII generator 118 of MLM 116 can generate synthetic PII data based on the training data 122 and a fake PII model. A fake PII detector 120 of MLM 116 can receive the generated synthetic PII and provide an indication of whether the synthetic PII is fake. If the fake PII detector 120 determines that the synthetic PII is fake, the model parameters can be adjusted. The process can be repeated until a fake PII model is generated that provides acceptable performance in generating synthetic PII. The fake PII model can be stored in PII database 110 as a fake PII model 114. In some aspects, the MLM 116 can include separate generators 118 and detectors 120 for each of the attributes. For example, separate generators can be trained for each of names, addresses, birthdates, credit card data, profile pictures etc.

Browser 102 can be any type of web browser application such as MICROSOFT® INTERNET EXPLORER®, MICROSOFT EDGE®, GOOGLE® CHROME®, MOZILLA® FIREFOX®, APPLE® SAFARI® etc. As noted above, browser 102 includes an auto-fake browser plugin 104. Auto-fake plugin 104 is loadable by browser 102 and becomes a part of browser 102. Auto-fake plugin 104 typically extends the functionality of browser 102. A plugin may also be referred to as an extension. In some embodiments, auto-fake plugin 104 is an auto-fill plugin that interacts with synthetic ID generator 108 to generate fake identifiers 126 that can be associated with particular sets of synthetic PII. In some aspects, the auto-fake plugin 104 may be activated based upon a user request. In other aspects, the auto-fake plugin 104 may detect that a form is embedded in a web page and can automatically be activated. A fake identifier 126 and its associated synthetic PII can be used for entry into one or more forms for a server application 130 that receives PII.

Server application 130 can be any application that provides a web form 106 to a browser 102 for use in providing content, service or other functionality via the web browser. In some embodiments, server application 130 can be a web application that uses form-based authentication. The embodiments are not limited to any particular type of server application. Service application 130 may be configured to receive an identifier and PII to be associated with the identifier. The service application 130 can store the PII as part of an account 140 associated with the identifier in a service database 128.

In some embodiments, a service 130 can include a fake detector 132. The fake detector 132 can analyze the PII received via a web form 106 and make a determination of whether the PII is fake. For example, the fake detector 132 may analyze the PII to determine if the user has entered fake (e.g., untrue or unreal) information in an attempt to avoid providing private information or to otherwise deceive the service application 130.

The fake detector 132 may perform various checks on the web form 106 data to determine if the web form 106 data is fake. The fake detector 132 may perform syntax checks on the data to determine if one or more fields of the web form 106 data have improper syntax. As an example, a zip code field may be checked to make sure the zip code is an integer number, or that it is a string that contains only alphanumeric characters.

The fake detector 132 may perform semantic checks on one or more fields of the web form 106 data. For instance, the fake detector may check to make sure that one field of the web form 106 data is consistent with one or more other fields of the web form 106 data. As an example, the fake detector 132 may check to make sure the zip code is a correct zip code for the city or state entered on the web form 106 data. The fake detector may check to make sure that the area code and phone prefix data actually exist and are consistent with one another.

The fake detector 132 may perform plausibility checks. For example, the fake detector 132 may estimate a user's age based on a supplied profile picture and determine if the estimated age is plausible with respect to an actual age entered on the web form 106 data or determined from a birth date entered on the web form 106 data.

If the fake detector 132 determines that the information entered on the web form 106 is incorrect or fake, the service application 130 may refuse to accept the web form 106 data and provide a response back to the browser indicating that the information is incorrect or fake. The service application can refuse to create an account 140 or refuse to provide access to content or services if the fake detector 132 determines that the web form 106 data is fake.

An example of the operation of system 100 will now be provided. A user "X" may navigate to a web site provided by a service application 130. The service application 130 may provide a web form 106 to receive information for the user, some of which may be PII. In response to receiving the web form 106, browser 102 may invoke auto-fake plugin 104. As user X enters their personal data 124 onto the web from 106, the auto-fake plugin 104 can replace the actual personal data 124 with synthetic data generated by synthetic ID generator 108 using fake PII models 114 generated by MLM 116. For example, synthetic ID generator 108 may generate a fake ID "A" 126 along with synthetic PII that is to be associated with fake ID "A". The web form 106 data (including synthetic PII) can be submitted to the service application A along with the fake ID "A". If the service application A 130 accepts the synthetic PII, the service application A can deliver the requested data or service associated with the fake ID "A".

In response to receiving an indication that the synthetic PII was accepted by service application A 130, the auto-fake plugin can cause the synthetic ID generator 108 to store a mapping 112 from the actual user ID "X" to the fake ID "A". In some aspects, the auto-fake plugin can log each time a fake ID is used. For example, the auto-fake plugin 104 can create a log entry of the form <timestamp, true id identifier, fake id identifier, website, result>. The mapping 112 may include other information regarding the fake ID "A", such as the PII associated with the fake ID "A" and optionally a randomly generated password associated with the fake ID "A". When the user accesses the service again, the auto-fake plugin 104 can present the previous fake ID used for the website by matching the current service website with a web site in the log. The user can choose to use the previously generated fake ID, have the auto-fake plugin 104 generate a new fake ID, or supply an ID.

As noted above, a fake password may be randomly generated to use along with the fake ID. The fake password can be used as further described below to detect breaches.

As the user "X" interacts with other service applications, the auto-fake plugin 104 may use synthetic ID generator 108 to generate other fake IDs and other synthetic PII to be associated with the fake IDs. For example, auto-fake plugin 104 may cause synthetic ID generator 108 to generate a fake id "B" and synthetic PII for use with service application B, and a fake ID "C" and synthetic PII to use with service application C. As new fake IDs are generated for various service applications, the synthetic ID generator 108 can store the mappings from actual user ID "X" to the fake IDs in fake ID mappings 112.

In some embodiments, the auto-fake plugin 104 can be a version of the "Deep-Autofill" plugin for the Chrome browser that has been modified as indicated per the techniques described in the disclosure. Additionally, the auto-fake plugin 104 and/or the synthetic PII generator may incorporate the Tensorflow.js library that provides machine learning model functionality. For example, the Tensorflow.js library provides functionality for training, using and modifying machine learning models (e.g., fake PII models 114).

Figure 2:
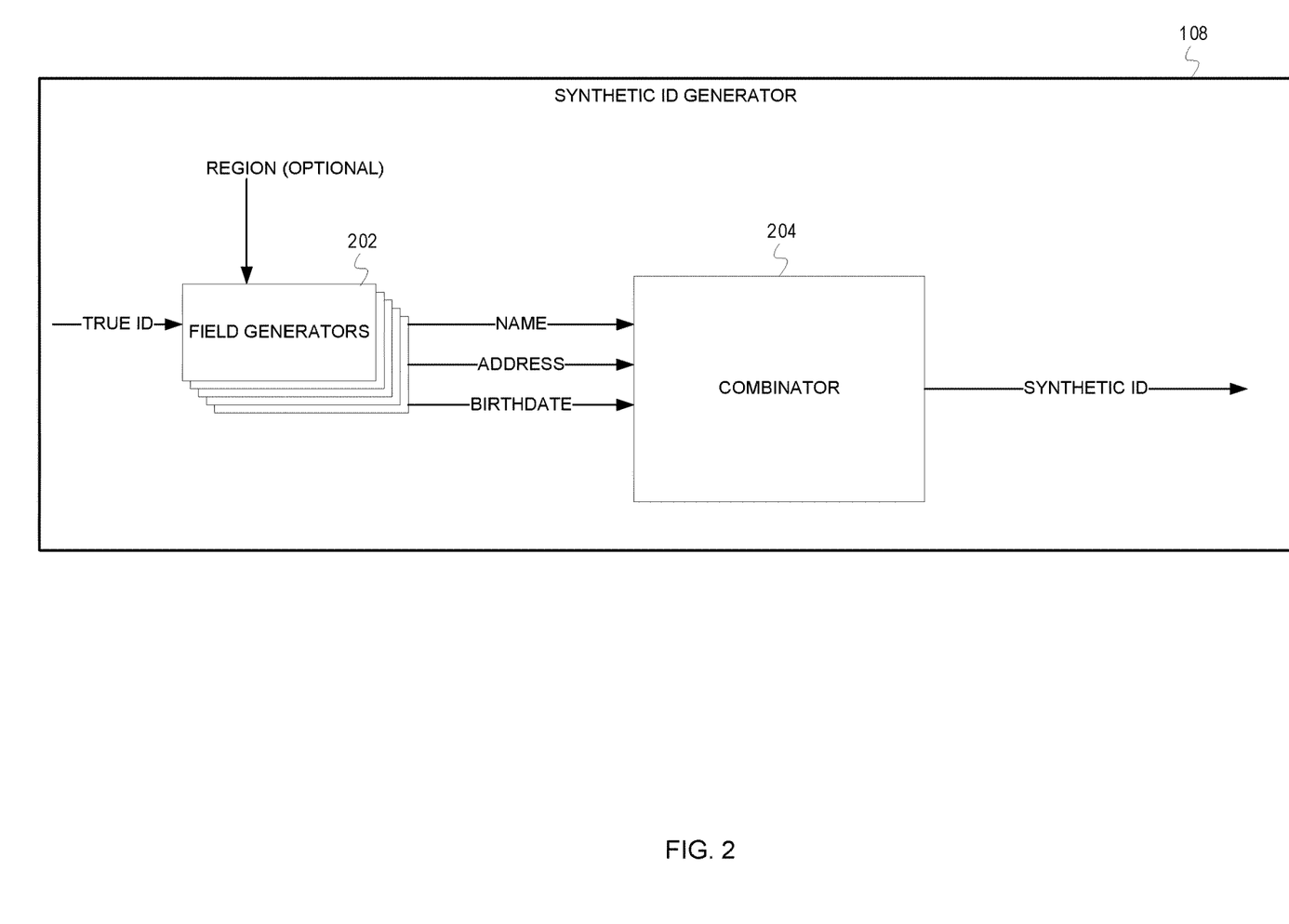
FIG. 2 is a block diagram illustrating further details of the synthetic ID generator of FIG. 1.

FIG. 2 is a block diagram illustrating further details of the synthetic ID generator 108 of FIG. 1. In some embodiments, the synthetic ID generator 108 includes one or more field generators 202 and a combinator 204. The field generators 202 can receive source PII. As noted above, the source PII can be true PII (i.e., PII that is a user's true PII) or the PII of a randomly selected persona. The one or more generators may be field specific generators that can be individual pipelines applied to parts of the source PII. For example, one field generator can use fake PII models 114 to generate fake or synthetic name data from the source PII. Similarly, a second of the field generators 202 can use fake PII models 114 to generate fake or synthetic address data. A third of the field generators 202 can use fake PII models 114 to generate fake or synthetic birthdate data. Other generators may be used to generate other types of field data.

The pipelines feed their generated PII fields into combinator 204. Combinator 204 perform checks to make sure the generated PII are semantically correct when combined together. Combinator 204 may perform other checks on the data to make sure that the data is plausible when combined. If the combined data is not semantically correct, or is incorrect in some other way, the combinator 204 can cause the field generators 202 to generate new synthetic PII. If the generated field data is semantically correct, it can be used as synthetic or fake PII and may be associated with a fake ID.

In some embodiments, the field generators 202 may optionally receive a region indicator as input. The region indicator can indicate a geographic, demographic, or other region and can be used to cause the field generators to generate data that is appropriate for the region. For example, if the region indicator is set to "India", then names, addresses and other fields may be generated such that they conform to names and addresses commonly used in India.

The field generators 206 may be configured to generate data for a particular form. For example, a form may be analyzed to determine which fields are PII, and then field generators 202 can be selected and configured to generate synthetic PII for the form. The combinator 204 can produce a customized model that can be used to generate synthetic PII for the form. Other forms may have their own associated customized model that can be used to generate synthetic PII.

Figure 3:
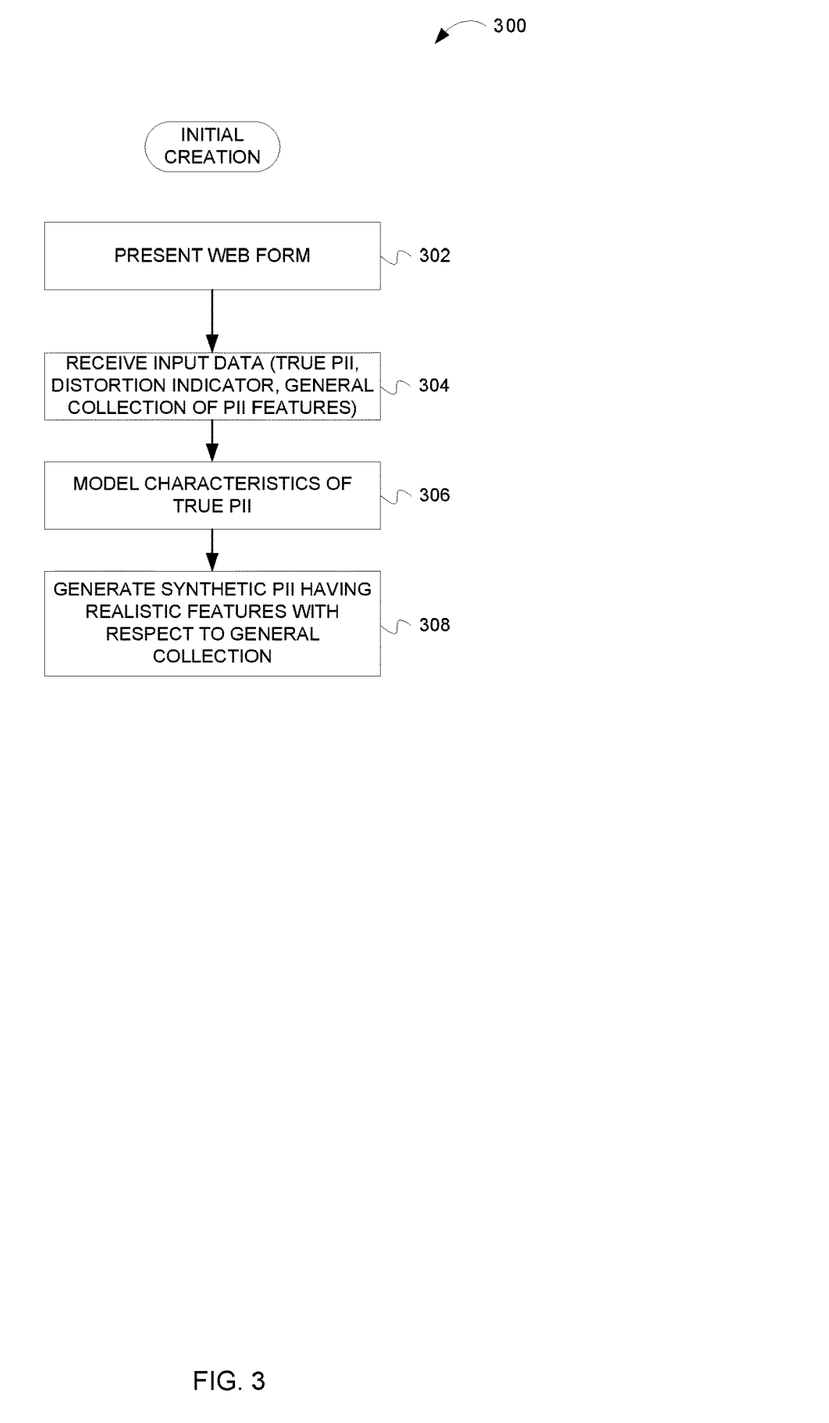
FIG. 3 is a flow chart illustrating operations of a method for a plugin to create synthetic PII for submission on a web form.
Figure 4:
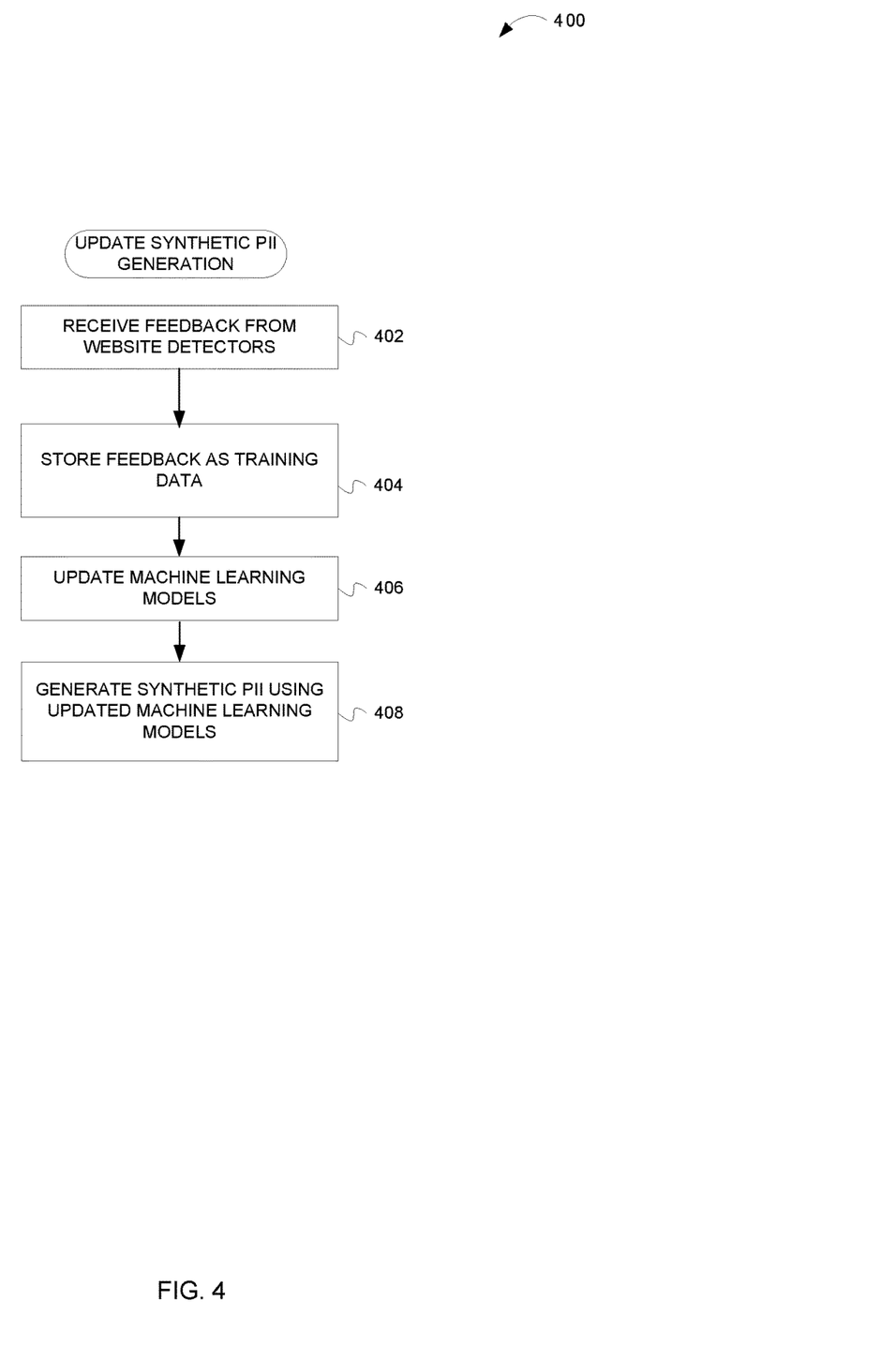
FIG. 4 is a flow chart illustrating operations of a method for a plugin to update generation of synthetic PII based on feedback from external sources such as website fake detectors.

Further details on the operation of system 100 will now be provided with reference to FIGS. 3-4.

FIG. 3 is a flow chart 300 illustrating operations of a method for a plugin to create synthetic PII for submission on a web form. The method begins at block 302 by presenting a web form on a browser. The web form may include one or more fields, some or all of which may be fields comprising PII.

At block 304, a plugin such as an auto-fake plugin receives input data. The input data may be the user's source PII corresponding to the fields on the form. The source PII can be the user's true PII or the PII of a randomly selected persona. The auto-fake plugin may also receive a general collection of PII including features that can be used to generate the synthetic PII. In some embodiments, the input data may include an indication of how much to blur or distort the actual PII data when generating synthetic PII data. For example, the user may set a blur factor using a user interface element such as a knob or slider to set the acuity of the generated synthetic PII. In some aspects, a single user interface element may be used to apply an overall blur factor to each PII element. In other aspects, a user interface element may be used per PII element that sets a blur factor specific to the element. In some aspects, the user interface element(s) may be provided upon an initial generation of the synthetic PII. If the synthetic PII is reused, the user interface element(s) may not be provided. The blur factor can determine how much noise is added to the PII.

In some embodiments, the input data may include an indication of one or more fields where the PII data is to be preserved when generating synthetic PII data. For example, age data or geographic region data may need to be preserved or at least constrained in order to meet the requirements of the service application receiving the PII data. Additionally, it may be advantageous for a user to allow the auto-fake plugin to provide an accurate email-address or accurate phone number as part of the synthetic PII so that the user can be contacted by a provider of the service application if necessary. In such embodiments, the synthetic PII data may include a combination of source PII data (i.e., the preserved user data) and generated data (i.e., data that is generated and not the user's actual PII). In cases where a user wants to use their true PII, the user may click on the desired field, select an icon in the desired field, or otherwise select the element to cause the input data to revert to the true PII.

In some embodiments, the user can set desired characteristics that can be used to influence the generator to yield a desired result with respect to the generated PII. For example, the user may desire to pretend to be someone else e.g., a user with particular demographics. The user can set desired characteristics so that the generator can generate PII within the desired demographics. For example, the user can store a profile containing the desired demographics that can be used to generate the synthetic PII. For instance, the profile could indicate "Always use India" as a basis for name generation. Alternatively, the user can enter the desired demographic characteristics on each relevant form.

The above-described parameters (e.g., the source PII, blur factor, and optionally the desired characteristics) can be supplied to the synthetic PII generator along with a random number sequence. The random number sequence can be used so that the synthetic PII generator can yield a new set of synthetic PII whenever a new random number sequence is supplied.

At block 306, the synthetic PII generator uses the supplied parameters and the available models to produce a customized pipeline to infer a synthetic id from the parameters and the information encoded in the models. As described above, the pipeline contains field generators 202 (FIG. 2) with respect to the fields where synthetic PII data is to be generated and combinators 204 (FIG. 2) that produce a semantically correct combination of individual synthetic id attributes. In some embodiments, a user interface can be provided to generate create synthetic PII. The user interface may have three sets of input fields. A first set of input fields can be the fields that receive the source PII for a form. The second set of input fields can comprise parameters to influence the generation of synthetic PII. For example, the second set of fields can provide demographic characteristics that are to constrain the synthetic PII. The third set of fields can comprise the generated synthetic PII. If the user is satisfied with the generated synthetic PII, the user can store the synthetic PII for use in filling in forms. If the user is not satisfied with the generated synthetic PII, the user can cause new synthetic PII to be generated. This process can be repeated until the user is satisfied with the generated synthetic PII.

At block 308, the synthetic PII generator uses the supplied parameters, the ML models generated by the MLM 116, and the model characteristics of the source PII to generate synthetic PII having realistic features (e.g., features that are likely to avoid being detected as fake). The generated synthetic PII can be returned to the auto-fake plugin for use in filling in the web form. A fake user identifier to go along with the synthetic PII can also be generated and associated with the synthetic PII. The fake user identifier can be included in a mapping from an actual user identifier to the fake identifier.

FIG. 4 is a flow chart 400 illustrating operations of a method for a plugin to update generation of synthetic PII based on feedback from external sources such as website fake detectors. In particular, the method incorporates feedback from websites such that the generation of synthetic PII evolves to more readily defeat fake detectors in websites.

At block 402, the synthetic PII generator receives feedback from the website in response to submitting webform data. As noted above, some websites have fake detectors or error detectors that can detect fake or erroneous input data on the forms supplied by the website. The service application associated with the website can provide positive or negative feedback regarding whether the web form data is successfully entered or if there is a failure to enter the web form data by the service application. For example, a website might respond with positive feedback by displaying "account created" or "download content here" on the browser in response to determining that the web form data was valid and not fake. As an example, of negative feedback, the service application may display an indication that a change is required to one or more of the fields of the web form.

At block 404, the synthetic PII generator can store the feedback (whether positive or negative) along with the synthetic PII data that was submitted that the subject of the positive or negative feedback. The feedback along with the associated PII data can be stored as training data At block 406, the synthetic PII generator can update the machine learning models by retraining the machine learning models using the original training data and the feedback provided by websites. In some embodiments, retraining can occur each time the synthetic PII generator receives feedback (whether positive or negative). In alternative embodiments, retraining can occur at periodic intervals or when a sufficient number of feedbacks have been received.

At block 408, the synthetic PII generator use supplied parameters and the updated machine learning models to generate synthetic PII as described above with respect to FIG. 3. The updated machine learning models can cause the newly generated synthetic PII to be less likely detected as erroneous or fake PII.

In the above-described aspects, source PII such as a user's true PII or the PII of a randomly selected personal have been used to generate synthetic PII. In some embodiments, source PII is not used and a user need not enter any parameters on a form. In such embodiments, the synthetic PII may be generated using only the information incorporated in MLM 116 during a training phase of the MLM 116.

As will be appreciated from the foregoing, a practical application of some embodiments is that an automatic privacy layer between a user and websites is provided. The automated generation of realistic synthetic PII has advantages over conventional systems by providing automated protection of consumer privacy.

In addition to directly protecting consumer privacy by automatically generating synthetic PII, some embodiments can generate synthetic PII that can be used to locate data breaches and track movement of PII leaked in a data breach. For example, the synthetic PII can be fingerprinted, for example, as part of the synthetic ID generation process. The fingerprinted synthetic PII can map leaked PII to a particular data processor (e.g., a particular service provider or website provider). Further, the appearance of the leaked fingerprinted synthetic PII on other services or websites can be used to reveal how leaked PII data is resold. This can provide a benefit over conventional systems in that the tracking of the leaked PII data can aid in understanding the ecosystem of how third parties share and resell PII data. Further, locating potential breaches of webservices can be a practical application of the techniques of the disclosure by allowing a system to warn consumers and implement security and privacy in the event of a data breach. These advantages can be obtained even if the data processor fails to reveal the breach and resulting data exfiltration.

Figure 5:
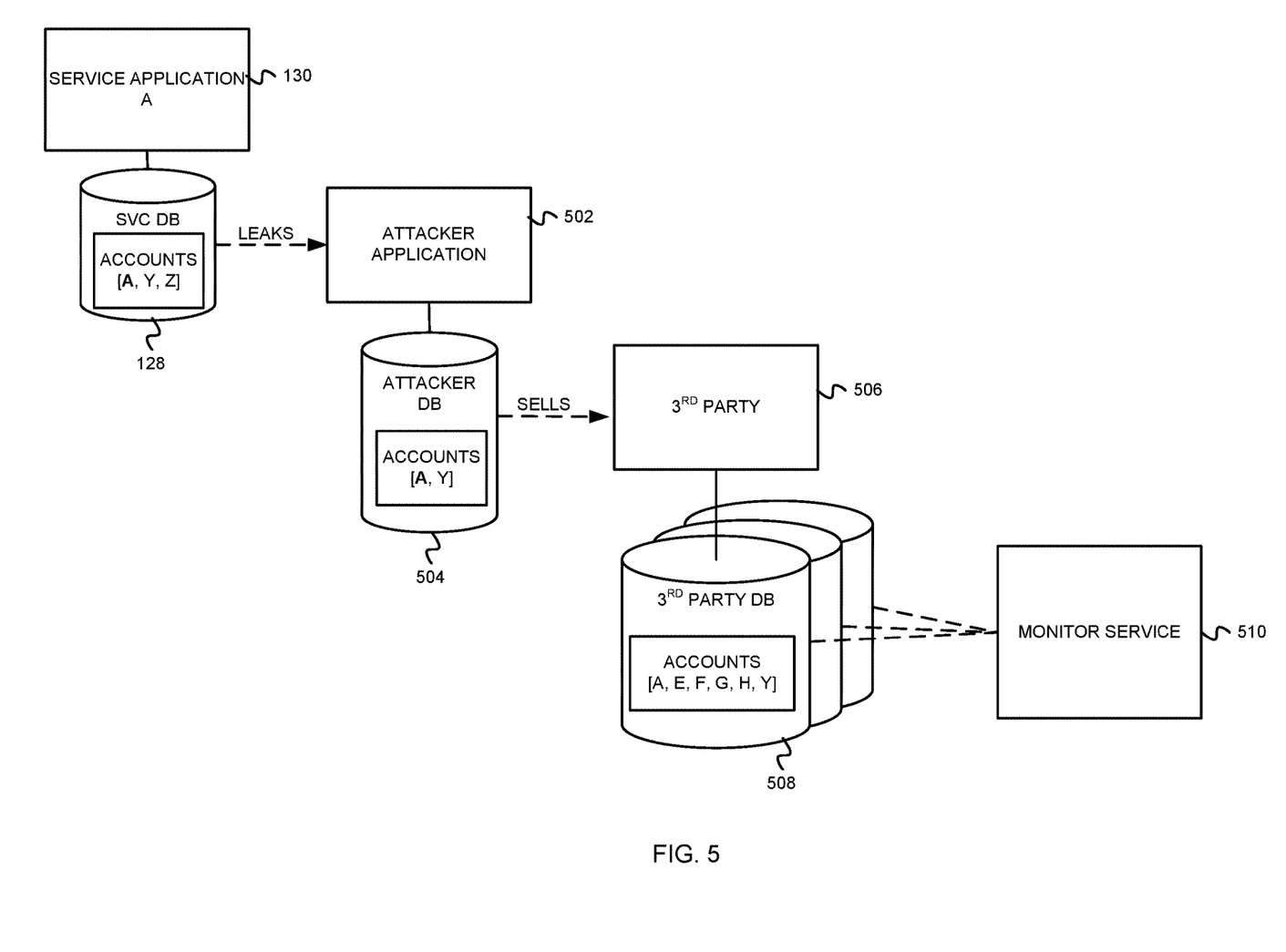
FIG. 5 is a block diagram illustrating a system environment 100 for detecting and tracking data leaks according to embodiments.

FIG. 5 is a block diagram illustrating a system environment 100 for detecting and tracking data leaks according to embodiments. The example system environment 100 can include a service application 130, an attacker application 502, third party systems 506, and a monitor service 510. Service application 130 may be a system in which some of the accounts have been created using synthetic PII. The synthetic PII may be generated as discussed above with reference to FIGS. 1-4. In the example system environment illustrated in FIG. 5, service application 130 maintains accounts "A", "Y" and "Z", where account "A" has been created using synthetic PII. Further, the synthetic PII for account A can be fingerprinted, and the resulting fingerprint can be distributed among the synthetic PII for the account A. Accounts Y and Z in the example have actual or real PII for their respective users.

Attacker application 502 can be an application, perhaps a malicious application, that can exploit security vulnerabilities in service application 130 to obtain account data from the service database 128 of service application 130. In the example illustrated in FIG. 5, the attacker application has obtained account data for accounts A and Y and maintains the exfiltrated data in attacker database 504. Thus, attacker application 502 has fingerprinted synthetic PII for account A, and actual PII for account Y stored in attacker database 504.

Attacker application 502 can sell or other distribute the leaked data to one or more third parties 506. A third party 506 can maintain the data in a third-party database 508. In the example illustrated in FIG. 5, a third party 506 has obtained PII for accounts A and Y from attacker application 502 and has also obtained PII for accounts E-H from other systems.

Monitor system 510 can periodically obtain data from third party database 508. For example, some third parties resell or otherwise make leaked data available for purchase or download and use by other potentially malicious systems. Monitor system 510 can obtain the data in the same way as such malicious systems and analyze the data to determine if any fingerprinted PII appears in the third-party data 508. In the example illustrated in FIG. 5, monitor system 510 may obtain the account data in third-party database 508 and determine that fingerprinted data exists in the database for account A. Thus, monitor system can determine that service application 130 has experienced a data breach or other data leak event. The monitor system can inform relevant parties (e.g., the provider of service application 130, affected users (e.g., users whose data has been fingerprinted), and authorities charged with receiving reports of data breaches (e.g., governmental or private security organizations).

Figure 6:
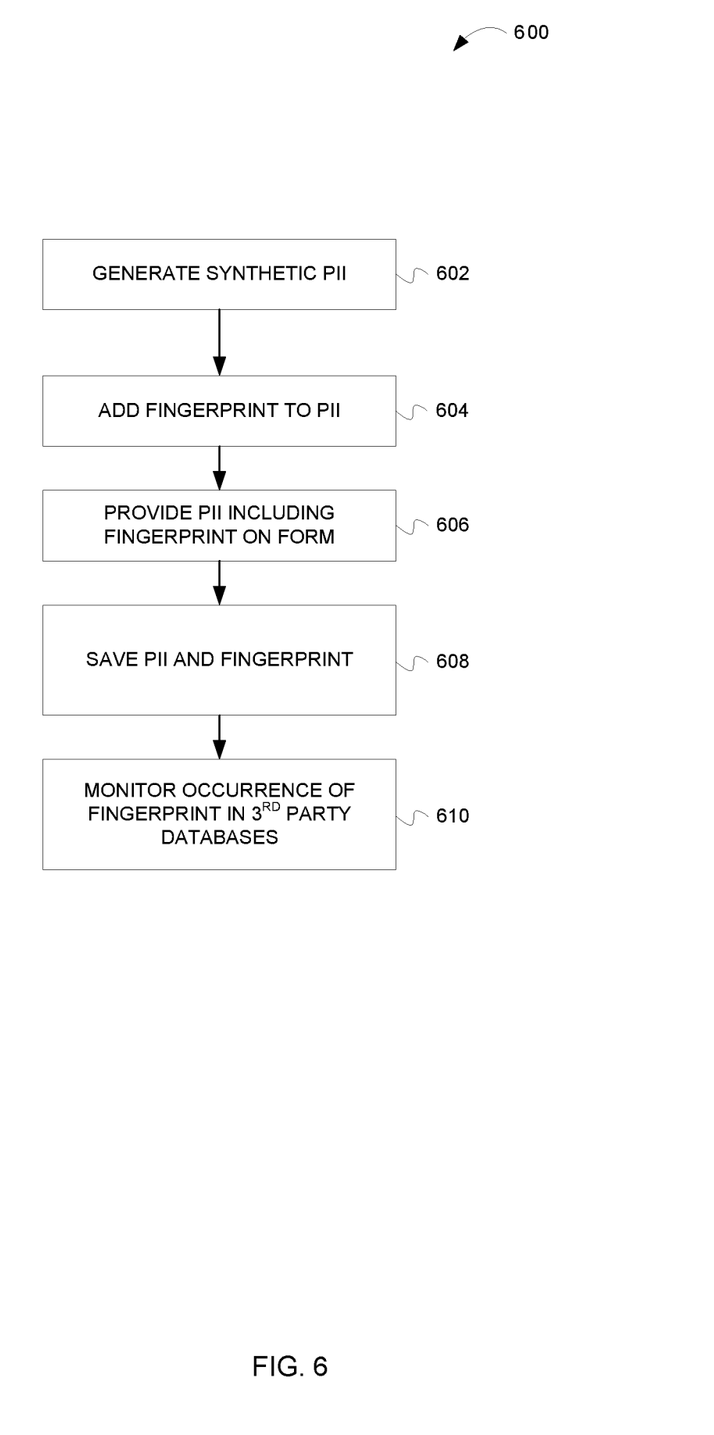
FIG. 6 is a flowchart illustrating operations of a method for detecting data leaks according to embodiments.

FIG. 6 is a flowchart illustrating operations of a method for detecting data leaks according to embodiments. The method begins at block 602 where a synthetic PII generator can use the techniques described herein to generate synthetic PII for a user.

At block 604, the synthetic PII generator can add one or more fingerprints to the synthetic PII to create fingerprinted synthetic PII. Various method of fingerprinting the synthetic PII are possible. For example, the fingerprint can comprise a random number. The fingerprint can be a hash of the synthetic PII along with a URL or other identifier of the service application that originally received the PII via a web form or other method.

The generated fingerprint can be added to the PII. For example, the fingerprint can be placed in an unused field or empty field of the web form. As an example, assume that the fingerprint has the value "17" and that the address field is not currently being used by the synthetic PII. The synthetic PII generator can add the value 17 to the unused address field instead of leaving the address field empty. As an example, the synthetic PII record {name: "Smith", Address: ""} can be fingerprinted as {name: "Smith", Address: "17"}. Alternatively, the fingerprint can be concatenated with synthetic PII values. For example, assume that the PII comprises a name and address field {name: "Smith", Address: "Elm St."}. The fingerprint 17 can be added to either or both of the name or address fields, e.g., {name: "Smith17", address: "Elm St."}. Further, the fingerprint can be sprayed across PII fields according to a substitution schema. For example, the record {name: "Smith", address: "Elm St"} can be fingerprinted as {name: "Sm1th", address: "E7m St"}. Other fingerprinting methodologies are possible and within the scope of the disclosure, in particular those where fingerprinting becomes part of the synthetic id generation process.

At block 606, the fingerprinted synthetic PII can be supplied on a web form and provided to a service application.

At block 608, the synthetic PII generator can store the fingerprinted PII. In some embodiments, a tuple may be stored along with the fingerprinted synthetic PII. The tuple can comprise {fake user ID, timestamp, website or other Internet identifier}.

At block 610, a monitoring system can monitor for the occurrence of a fingerprint in PII data obtained from providers of leaked data. The existence of the fingerprint in the leaked data demonstrates that a leak has occurred. The timestamp stored as indicated above can be used to estimate a time of the breach. The appearance of multiple fingerprints in the data can indicate higher accuracy in the conclusion that a data breach has occurred.

The monitoring system can generate an indication that the synthetic PII has been discovered in leaked data in response to detecting the existence of the fingerprint in the leaked data. This indicator can be provided to a user, a system administrator, or other party to alert the party that the system initially receiving the fingerprinted synthetic PII has experienced a data breach.

Figure 7:
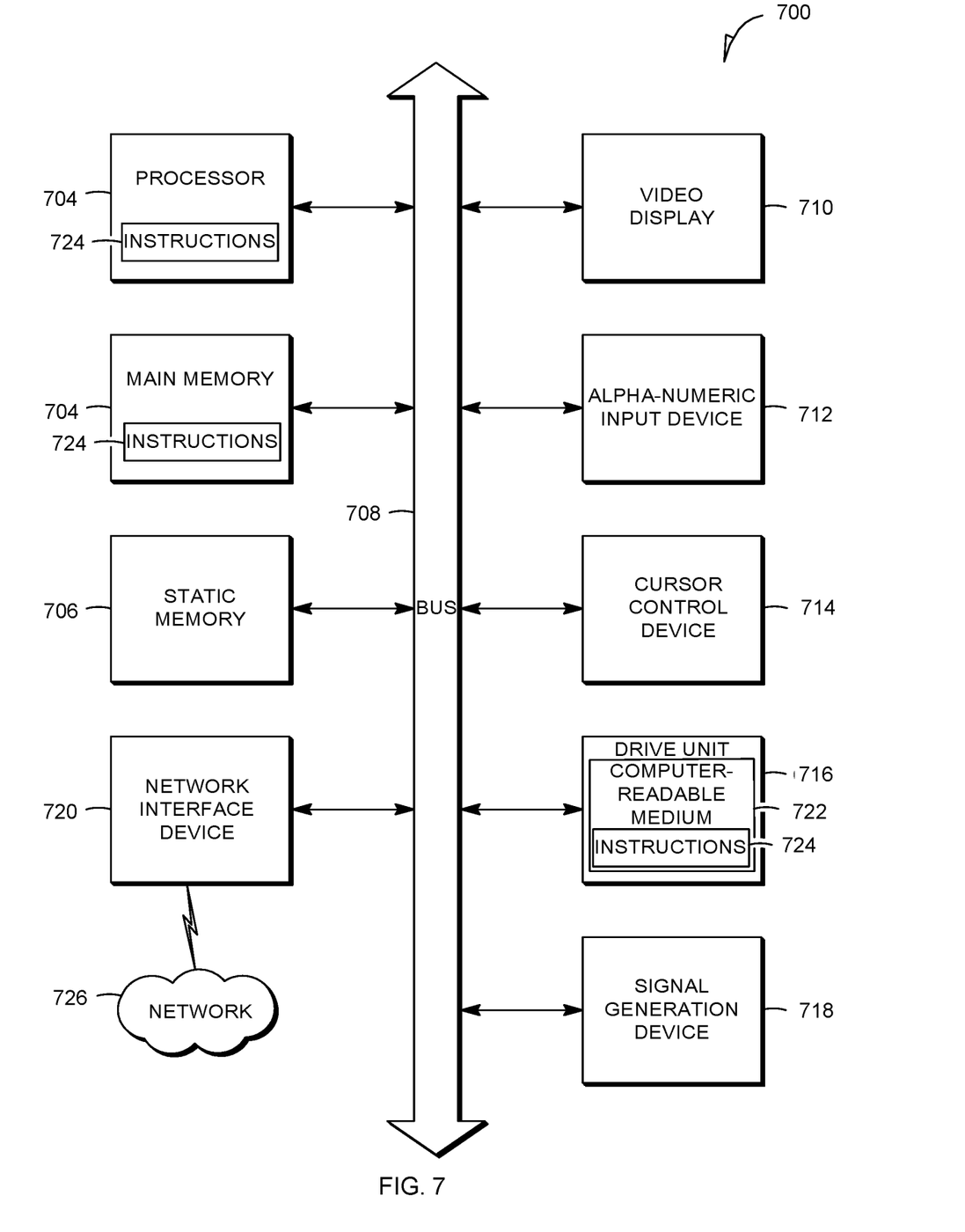
FIG. 7 is a block diagram of an example embodiment of a computer system upon which embodiments of the inventive subject matter can execute.

FIG. 7 is a block diagram of an example embodiment of a computer system 700 upon which embodiments of the inventive subject matter can execute. The description of FIG. 7 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 7 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 7, an example embodiment extends to a machine in the example form of a computer system 700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In example embodiments, the computer system 700 also includes one or more of an alpha-numeric input device 712 (e.g., a keyboard), a user interface (UI) navigation device or cursor control device 714 (e.g., a mouse), a disk drive unit 716, a signal generation device 718 (e.g., a speaker), and a network interface device 720.

The disk drive unit 716 includes a machine-readable medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 724 may further be transmitted or received over a communications network 726 using a signal transmission medium via the network interface device 720 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method comprising:
  receiving, by one or more processors into a non-transitory machine-readable medium, a form having one or more fields for receiving personally identifying information (PII);
  receiving, by the one or more processors, input data for the form, the input data comprising source PII;
  modelling, by the one or more processors, the characteristics of the source PII to generate a model associated with the form;
  generating, by the one or more processors, synthetic PII based, at least in part, the source PII and the model;
  providing, by the one or more processors, the synthetic PII to the one or more fields of the form;
  receiving, by the one or more processors, a distortion indicator via a user interface element associated with the one or more fields of the form, wherein the user interface element is a knob or a slider actuated by a user to indicate how much to distort data associated with one or more fields of the form wherein generating the synthetic PII comprises generating the synthetic PII based, at least in part, on the distortion indicator; and
  determining, by the one or more processors, whether the received PII for the one or more fields is fake, and determining, by the one or more processors, whether the synthetic PII for the one or more fields is plausible.

2. The method of claim 1, further comprising:
receiving, by the one or more processors, an indication that source PII is to be preserved for a subset of the one or more fields; and
providing, by the one or more processors, the source PII to the subset of the one or more fields.

3. The method of claim 1, further comprising:
receiving, by the one or more processors, demographic characteristics;
wherein generating the synthetic PII comprises generating the synthetic PII based, at least in part, on the demographic characteristics.

4. The method of claim 1, further comprising:
receiving, by the one or more processors, a region indicator;
wherein generating the synthetic PII comprises generating the synthetic PII based, at least in part, on the region indicator.

5. The method of claim 1, further comprising:
generating, by the one or more processors, one or more machine learning models based on training data, the training data comprising PII;
wherein generating the model associated with the form comprises generating the model, based at least in part, on the one or more machine learning models.

6. The method of claim 5, further comprising:
submitting the form to a service application;
receiving feedback for at least one field of the form from the service application;
storing the feedback as updated training data;
updating the machine learning models based, at least in part on the updated training data.

7. The method of claim 1, further comprising:
adding a fingerprint to field data for the one or more fields for receiving PII;
storing the fingerprint;
submitting the form including the field data to a service application;
receiving leaked data from third party system; and
generating an indication that the service application has experienced a data breach in response to determining that the fingerprint is present in the leaked data.

8. The method of claim 1, wherein the source PII comprises true PII for a user.

9. The method of claim 1, wherein the source PII comprises PII of a randomly selected persona.

10. The method of claim 1, wherein determining, by the one or more processors, whether the received PII for the one or more fields is fake, comprises analyzing the information provided by a user for the one or more fields and determining whether the information is untrue or unreal.

11. The method of claim 1, wherein determining, by the one or more processors, whether the synthetic PII for the one or more fields is plausible, comprises determining if the synthetic PII for any one of the one or more fields: has a proper syntax, is of the correct data type, and is not inconsistent with synthetic PII for any other one of the one or more fields.

12. The method of claim 1, wherein upon determining, by the one or more processors, that the received PII for the one or more fields is fake or that the synthetic PII for the one or more fields is not plausible, notifying the user, by the one or more processors, and refusing, by the one or more processors, access to content or services.

13. A system comprising:
one or more processors; and
a machine-readable medium accessible to the one or more processors and storing instructions that, when executed, cause the one or more processors to:
receive a form having one or more fields for receiving personally identifying information (PII),
receive input data for the form, the input data comprising source PII,
receive a distortion indicator via a user interface element associated with the one or more fields of the form, wherein the user interface element is a knob or a slider actuated by a user to indicate how much to distort data associated with one or more fields of the form,
model the characteristics of the source PII to generate a model associated with the form,
generate synthetic PII based, at least in part, the source PII, the distortion indicator, and the model,
provide the synthetic PII to the one or more fields of the form, and
determine whether the received PII for the one or more fields is fake, and determine whether the synthetic PII for the one or more fields is plausible.

14. The system of claim 13, wherein the instructions further comprise instructions to cause the one or more processors to:
receive a distortion indicator;
wherein the instructions to generate the synthetic PII comprise instructions to generate the synthetic PII based, at least in part, on the distortion indicator.

15. The system of claim 13, wherein the instructions further comprise instructions to cause the one or more processors to:
determine whether the synthetic PII for the one or more fields is semantically correct when combined.

16. The system of claim 13, wherein the instructions further comprise instructions to cause the one or more processors to:
receive an indication that source PII is to be preserved for a subset of the one or more fields; and
provide the source PII to the subset of the one or more fields.

17. The system of claim 13, wherein the instructions further comprise instructions to cause the one or more processors to:
receive demographic characteristics;
wherein the instructions to generate the synthetic PII comprise instructions to generate the synthetic PII based, at least in part, on the demographic characteristics.

18. The system of claim 13, wherein the instructions further comprise instructions to cause the one or more processors to:
receiving a region indicator;
wherein the instructions to generate the synthetic PII comprise instructions to generate the synthetic PII based, at least in part, on the region indicator.

19. The system of claim 13, wherein the instructions further comprise instructions to cause the one or more processors to:
generate one or more machine learning models based on training data, the training data comprising PII;
wherein the instructions to generate the model associated with the form comprise instructions to generate the model, based at least in part, on the one or more machine learning models.

20. The system of claim 19, wherein the instructions further comprise instructions to cause the one or more processors to:
submit the form to a service application;
receive feedback for at least one field of the form from the service application;
store the feedback as updated training data;
update the machine learning models based, at least in part on the updated training data.

21. The system of claim 13, wherein the instructions further comprise instructions to cause the one or more processors to:
add a fingerprint to field data for the one or more fields for receiving PII;
store the fingerprint;
submit the form including the field data to a service application;
receive leaked data from third party system; and
generate an indication that the service application has experienced a data breach in response to determining that the stored fingerprint is present in the leaked data.

22. The system of claim 13, wherein the source PII comprises true PII of a user.

23. The system of claim 13, wherein the source PII comprises PII of a randomly selected persona.

24. A machine-readable medium having processor executable instructions, that when executed, cause one or more processors to:
receive a form having one or more fields for receiving personally identifying information (PII),
receive input data for the form, the input data comprising source PII,
model the characteristics of the source PII to generate a model associated with the form,
generate synthetic PII based, at least in part, the source PII and the model,
provide the synthetic PII to the one or more fields of the form;
receive a distortion indicator via a user interface element associated with the one or more fields of the form, wherein the user interface element is a knob or a slider actuated by a user to indicate how much to distort data associated with one or more fields of the form, wherein generating the synthetic PII comprises generating the synthetic PII based, at least in part, on the distortion indicator; and
determine whether the received PII for the one or more fields is fake, and determine whether the synthetic PII for the one or more fields is plausible.

* * * * *